US006961927B1

(12) United States Patent
Erb et al.

(10) Patent No.: US 6,961,927 B1
(45) Date of Patent: Nov. 1, 2005

(54) LOSSLESS, CONTEXT-FREE COMPRESSION SYSTEM AND METHOD

(75) Inventors: David Erb, Seattle, WA (US); Vinod K. Grover, Mercer Island, WA (US); Michael A.B. Parkes, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 475 days.

(21) Appl. No.: 09/722,774

(22) Filed: Nov. 27, 2000

(51) Int. Cl.[7] .......... G06F 9/44
(52) U.S. Cl. .......... 717/130; 717/131; 707/100; 707/101; 714/20; 714/45; 382/282
(58) Field of Search .......... 717/130–131; 707/100–101; 714/20, 45; 382/232

(56) References Cited

U.S. PATENT DOCUMENTS 4,262,737 A * 4/1981 Faillace .......... 165/267
5,212,772 A * 5/1993 Masters .......... 714/20
5,260,978 A * 11/1993 Fleischer et al. .......... 375/354
5,828,414 A * 10/1998 Perkins et al. .......... 375/240.01
6,106,571 A * 8/2000 Maxwell .......... 717/131
6,108,027 A * 8/2000 Andrews et al. .......... 348/14.14
6,119,213 A * 9/2000 Robbins .......... 711/202
6,295,541 B1 * 9/2001 Bodnar et al. .......... 707/203
6,339,616 B1 * 1/2002 Kovalev .......... 375/240.16
6,532,333 B1 * 3/2003 Ito .......... 386/52
6,563,875 B2 * 5/2003 Auvray et al. .......... 375/240.13
6,615,370 B1 * 9/2003 Edwards et al. .......... 714/45

* cited by examiner

*Primary Examiner*—Kakali Chaki
*Assistant Examiner*—Lawrence Shrader
(74) *Attorney, Agent, or Firm*—Merchant & Gould PC

(57) ABSTRACT

Lossless, context-free data compression is implemented using a data aware compression scheme that is specific to the type of data being compressed. A modified delta compression scheme is used in which difference information is encoded with reference to a set of typical difference values that commonly occur for the type of data being compressed. Selecting the compression scheme based on the type of data being compressed allows highly-compressed, yet lossless, compression. In addition, the contextual information required to uncompress information is reduced or eliminated, thereby enabling random access of the compressed data.

26 Claims, 3 Drawing Sheets

LOSSLESS, CONTEXT-FREE COMPRESSION SYSTEM AND METHOD

COPYRIGHT NOTICE AND PERMISSION

A portion of the disclosure of this patent document may contain material that is subject to copyright protection. The copyright owner has no objection to the facsimile reproduction by anyone of the patent document or the patent disclosure as it appears in the Patent and Trademark Office patent files or records, but otherwise reserves all copyright rights whatsoever. The following notice shall apply to this document: Copyright © 2000, Microsoft Corp.

FIELD OF THE INVENTION

The invention relates generally to data compression. More particularly, the invention relates to compression of data obtained by testing of computer program performance.

BACKGROUND

Computer programs have become increasingly complex as they provide more features. As complexity increases, the probability that a computer program will contain a programming error also increases dramatically. To reduce the probability of distributing a computer program with a programming error, software developers perform extensive testing.

Testing is also performed to measure and improve the performance of computer programs. Performance measurement involves monitoring the amount of time, e.g., processor cycles, used by the individual functions that make up a program. This knowledge enables developers to focus their efforts on improving the performance of components that need the most improvement. Because of the importance of thorough testing and because such testing can be very time-consuming, software developers have developed extensive testing procedures.

Some testing procedures involve inserting functions known as probes at selected points in computer code, such as entry and exit points of functions. These probes collect information of interest to the software developer, such as time stamps, stack addresses, and other counters and data records. This information allows developers to analyze and tune application performance.

Such profiling operations typically collect large amounts of data, particularly for long running and call intensive applications. As a result, data storage requirements and demands on processing resources are considerable. To address these issues, data compression techniques have been proposed to reduce data storage and processing needs. Most such techniques are dictionary-based and require a large amount of data to decompress selected data. For example, in certain techniques, to decompress a particular piece of information, it is necessary to decompress all of the information preceding the desired piece. As a result, real-time access to the compressed data is limited. In addition, many compression techniques are lossy and result in the loss of a certain amount of information. Compression also consumes computing resources and may have adverse effects on the accuracy of the profiling operation itself.

These limitations impede the usefulness of conventional data compression techniques in profiling operations, in which real-time access to data is important, and in which minimal interference with the profiling operation is desirable. Accordingly, a need continues to exist for a data compression scheme that adequately addresses these issues.

For maximum usefulness in profiling, it is desirable that the data compression scheme have a minimal effect on the performance data itself. Further, the data compression scheme should be easily integrated into the logging engine that collects the profiling data, and should be easily enabled or disabled by the user.

SUMMARY OF THE INVENTION

Lossless, context-free data compression is implemented using a data aware compression scheme that is specific to the type of data being compressed. A modified delta compression scheme is used in which difference information is encoded with reference to a set of typical difference values that commonly occur for the type of data being compressed. Selecting the compression scheme based on the type of data being compressed allows highly-compressed, yet lossless, compression. In addition, the contextual information required to uncompress information is reduced or eliminated, thereby enabling random access of the compressed data.

One implementation is directed to a data compression method that includes determining difference information as a function of the data to be compressed. If the difference information satisfies a size constraint, it is encoded with reference to a set of commonly occurring difference values for a type of the data to be compressed.

In another implementation, the data is profiling data from which difference information is determined. If the profiling data is timestamp data, the difference information is encoded as a signed quantity with reference to a set of commonly occurring timestamp difference values. If, on the other hand, the profiling data is stack data, the difference information is encoded as an unsigned quantity with reference to a set of commonly occurring stack difference values. For stack data, the sign of the difference is implied by the type of profile sample being encoded.

Still other implementations include computer-readable media and apparatuses for performing the above-described methods. The above summary of the present invention is not intended to describe every implementation of the present invention. The figures and the detailed description that follow more particularly exemplify these implementations.

DETAILED DESCRIPTION

In the following detailed description of various embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

Hardware and Operating Environment

Figure 1:
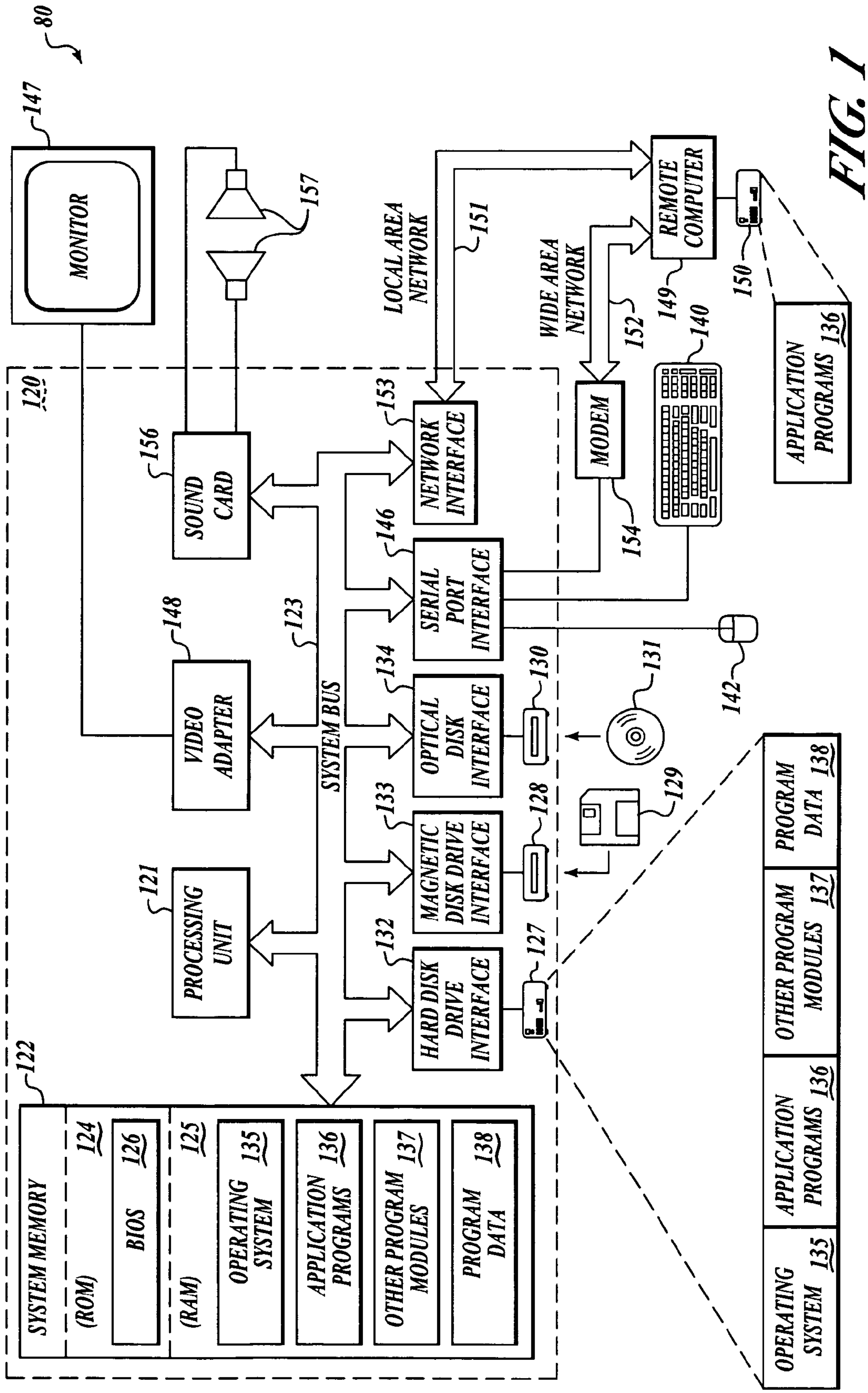
FIG. 1 illustrates a simplified overview of an example embodiment of a computing environment for the present invention.

FIG. 1 illustrates a hardware and operating environment in conjunction with which embodiments of the invention may be practiced. The description of FIG. 1 is intended to provide a brief, general description of suitable computer hardware and a suitable computing environment with which the invention may be implemented. Although not required, the invention is described in the general context of computer-executable instructions, such as program modules, being executed by a computer, such as a personal computer (PC). This is one embodiment of many different computer configurations, some including specialized hardware circuits to analyze performance, that may be used to implement the present invention. Generally, program modules include routines, programs, objects, components, data structures, etc. that perform particular tasks or implement particular abstract data types.

Moreover, those skilled in the art will appreciate that the invention may be practiced with other computer-system configurations, including hand-held devices, multiprocessor systems, microprocessor-based or programmable consumer electronics, network personal computers ("PCs"), minicomputers, mainframe computers, and the like. The invention may also be practiced in distributed computing environments where tasks are performed by remote processing devices linked through a communications network. In a distributed computing environment, program modules may be located in both local and remote memory storage devices.

FIG. 1 shows a computer arrangement implemented as a general-purpose computing or information-handling system 80. This embodiment includes a general purpose computing device such as personal computer (PC) 120, that includes processing unit 121, a system memory 122, and a system bus 123 that operatively couples the system memory 122 and other system components to processing unit 121. There may be only one or there may be more than one processing unit 121, such that the processor computer 120 comprises a single central-processing unit (CPU), or a plurality of processing units, commonly referred to as a parallel processing environment. The computer 120 may be a conventional computer, a distributed computer, or any other type of computer; the invention is not so limited.

In other embodiments other configurations are used in the personal computer 120. System bus 123 may be any of several types, including a memory bus or memory controller, a peripheral bus, and a local bus, and may use any of a variety of bus architectures. The system memory 122 may also be referred to as simply the memory, and it includes read-only memory (ROM) 124 and random-access memory (RAM) 125. A basic input/output system (BIOS) 126, stored in ROM 124, contains the basic routines that transfer information between components of personal computer 120. BIOS 126 also contains start-up routines for the system.

The personal computer 120 typically includes at least some form of computer-readable media. Computer-readable media can be any available media that can be accessed by the personal computer 120. By way of example, and not limitation, computer readable media may comprise computer storage media and communication media. Computer storage media includes volatile and nonvolatile, removable and non-removable media implemented in any method or technology for storage information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store the desired information and that can be accessed by the personal computer 120. Communication media typically embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included in the scope of computer readable media.

By way of example, the particular system depicted in FIG. 1 further includes a hard disk drive 127 having one or more magnetic hard disks (not shown) onto which data is stored and retrieved for reading from and writing to hard-disk-drive interface 132, magnetic disk drive 128 for reading from and writing to a removable magnetic disk 129, and optical disk drive 130 for reading from and/or writing to a removable optical disk 131 such as a CD-ROM, DVD or other optical medium. The hard disk drive 127, magnetic disk drive 128, and optical disk drive 130 are connected to system bus 123 by a hard-disk drive interface 132, a magnetic-disk drive interface 133, and an optical-drive interface 134, respectively. The drives 127, 128, and 130 and their associated computer-readable media 129, 131 provide nonvolatile storage of computer-readable instructions, data structures, program modules and other data for personal computer 120.

In various embodiments, program modules are stored on the hard disk drive 127, magnetic disk 129, optical disk 131, ROM 124 and/or RAM 125 and may be moved among these devices, e.g., from hard disk drive 127 to RAM 125. Program modules include operating system 135, one or more application programs 136, other program modules 137, and/or program data 138. A user may enter commands and information into personal computer 120 through input devices such as a keyboard 140 and a pointing device 42. Other input devices (not shown) for various embodiments include one or more devices selected from a microphone, joystick, game pad, satellite dish, scanner, or the like. These and other input devices are often connected to the processing unit 121 through a serial-port interface 146 coupled to system bus 123, but in other embodiments they are connected through other interfaces not shown in FIG. 1, such as a parallel port, a game port, or a universal serial bus (USB) interface. A monitor 147 or other display device also connects to system bus 123 via an interface such as a video adapter 148. In some embodiments, one or more speakers 157 or other audio output transducers are driven by sound adapter 156 connected to system bus 123. In some embodiments, in addition to the monitor 147, system 80 includes other peripheral output devices (not shown) such as a printer or the like.

In some embodiments, the personal computer 120 operates in a networked environment using logical connections to one or more remote computers such as remote computer 149. Remote computer 149 may be another personal computer, a server, a router, a network PC, a peer device, or other common network node. Remote computer 149 typically includes many or all of the components described above in connection with personal computer 120; however, only a storage device 150 is illustrated in FIG. 1. The logical connections depicted in FIG. 1 include local-area network (LAN) 151 and a wide-area network (WAN) 152, both of which are shown connecting the personal computer 120 to remote computer 149; typical embodiments would only include one or the other. Such networking environments are commonplace in offices, enterprise-wide computer networks, Intranets and the Internet.

When placed in a LAN networking environment, the personal computer 120 connects to local network 151 through a network interface or adapter 153. When used in a WAN networking environment such as the Internet, the personal computer 120 typically includes modem 154 or other means for establishing communications over network 152. Modem 154 may be internal or external to the personal computer 120 and connects to system bus 123 via serial-port interface 146 in the embodiment shown. In a networked environment, program modules depicted as residing within the personal computer 120 or portions thereof may be stored in remote-storage device 150. Of course, the network connections shown are illustrative, and other means of establishing a communications link between the computers may be substituted.

Software may be designed using many different methods, including object-oriented programming methods. C++ and Java are two examples of common object-oriented computer programming languages that provide functionality associated with object-oriented programming. Object-oriented programming methods provide a means to encapsulate data members (variables) and member functions (methods) that operate on that data into a single entity called a class. Object-oriented programming methods also provide a means to create new classes based on existing classes.

An object is an instance of a class. The data members of an object are attributes that are stored inside the computer memory, and the methods are executable computer code that act upon this data, along with potentially providing other services. The notion of an object is exploited in the present invention in that certain aspects of the invention are implemented as objects in some embodiments.

An interface is a group of related functions that are organized into a named unit. Some identifier may uniquely identify each interface. Interfaces have no instantiation; that is, an interface is a definition only without the executable code needed to implement the methods that are specified by the interface. An object may support an interface by providing executable code for the methods specified by the interface. The executable code supplied by the object must comply with the definitions specified by the interface. The object may also provide additional methods. Those skilled in the art will recognize that interfaces are not limited to use in or by an object-oriented programming environment.

EXAMPLE EMBODIMENTS

A data aware compression scheme that is specific to the type of data being compressed is used to achieve lossless, context-free data compression. In particular, a modified delta compression scheme is used in which difference information is encoded with reference to a set of typical difference values that commonly occur for the type of data being compressed. In order to facilitate random access to the data, a local context is used in the data compression scheme.

Profiling data is accumulated in a buffer and is periodically written to a profiling data file. Profiling data typically consists of a series of records, each containing a record identifier, a counter value (frequently a timestamp, but possibly any other counter value of interest), a stack address, and a program code address. Specifically, at the start of each buffer run, the absolute values of the counters are recorded. Later, successive differences in counter values are recorded when their encodings fit in a short word. As a result, less data needs to be recorded as compared with conventional techniques. Reduced time in writing the data to the profiling data file is also achieved. Smaller profiling data files are easier to store, read, move, and copy.

Furthermore, because less input/output (I/O) bandwidth is used, the collected performance data is a more accurate indicator of actual application performance. In a particular embodiment of the present invention, the user can specify the desired level of compression, taking into account tradeoffs between increased resource usage and decreased profiling data file size. For example, for minimum processor overhead, if file size and I/O bandwidth are not important considerations, the user can disable compression entirely.

In a particular embodiment of the present invention, compression is performed on a buffer-by-buffer basis. Performing compression in this matter allows the data compression scheme to be incorporated easily into the logging and analysis engines. To incorporate the data compression scheme into these or other components, one merely needs to locate a choke-point through which all buffers pass and insert a call to the compression or decompression utility function. To further facilitate integration and avoid the need for extra memory, compression occurs in place. Decompression can occur either in place or using a lookaside buffer.

Figure 2:
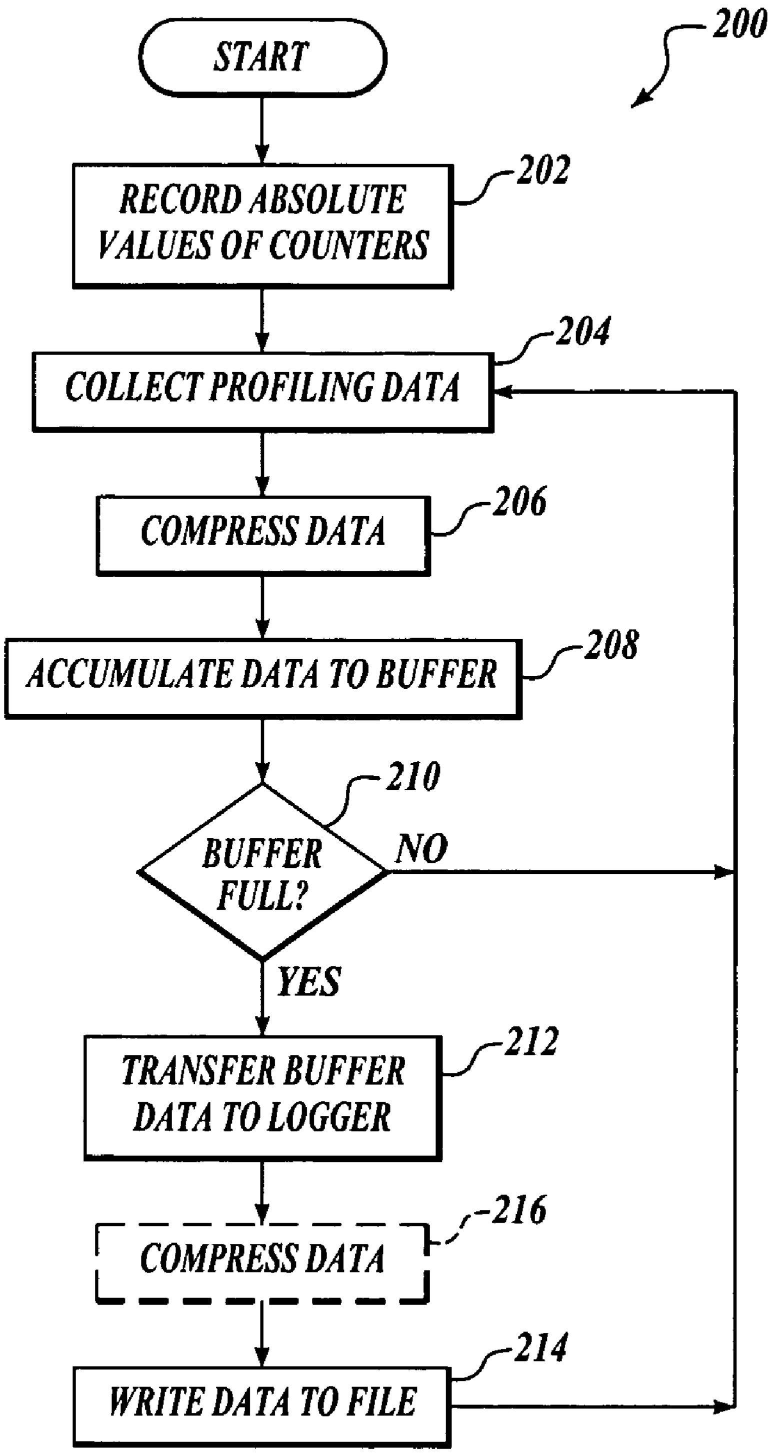
FIG. 2 is a flowchart that illustrates an example method for performing data compression, according to a particular implementation of the present invention.

Referring again to the drawings, FIG. 2 depicts an example method 200 for performing data compression, according to a particular embodiment of the present invention. First, profiling data is collected using, for example, conventional function entry and exit probes that are well-known in the art. The data is collected into a buffer and is periodically transferred to the logger for storage in the profiling data file.

As depicted at a block 202, at the beginning of each buffer run, the absolute values of the counters are recorded. Profiling data is then collected by probes at a block 204 and accumulated to the buffer at a block 208. Before the data is written to the file, however, it is compressed at a block 206. The compression scheme is data-aware and compresses the data in a way that depends on the type of data being compressed. An example compression scheme is described in further detail below in connection with FIG. 3.

As the buffer accumulates data, the system determines whether the buffer is full, as shown at a decision block 210. If the buffer is not full, flow returns to block 204, at which additional profiling data is collected. When the buffer becomes full, the data is transferred to the logger at a block 212 for writing to the profiling data file. The compressed buffer data is then written to the profiling data file at a block 214. The buffer having been flushed, execution then returns to block 204, and additional profiling data is accumulated to the buffer.

In an alternative embodiment of the present invention, compression is performed as the profiling data is written to the profiling data file at an optional block 216. The size of the profiling data file is thus decreased, at the expense of an increased effect on the profiling process itself. The dashed lines in FIG. 2 indicate that this compression is entirely optional and may be enabled or disabled at the user's option.

Compression of a buffer is performed outside of the profiled process, thereby avoiding attributing the time spent compressing the data to the profiled application. By compressing the blocks in the buffer writer as they are being prepared for writing to the buffer, all compression is performed in a profile monitor process, minimizing the effect of the compression process on the profiling process. In addition, compression is performed at intervals that are spaced out substantially evenly. As a result, the latency of the compression process is amortized over the intervals between storage of buffers to the profiling data file.

Because compression is performed after the profiling data is written to the buffer, the function entry and exit probes, as well as any other collection probes that are used, are not compression aware. As a result, the same probes can be used regardless of whether compression is enabled, and regardless of the type of compression algorithm being used. This helps reduce the testing burden and allows compression to be unit-tested on any buffer, whether the buffer is generated during collection, copied from a pre-existing profiling data file, or generated by the profiling data file writing test utility. Similarly, the analysis engine can analyze compressed files using exactly the same algorithms and data formats as uncompressed files.

Figure 3:
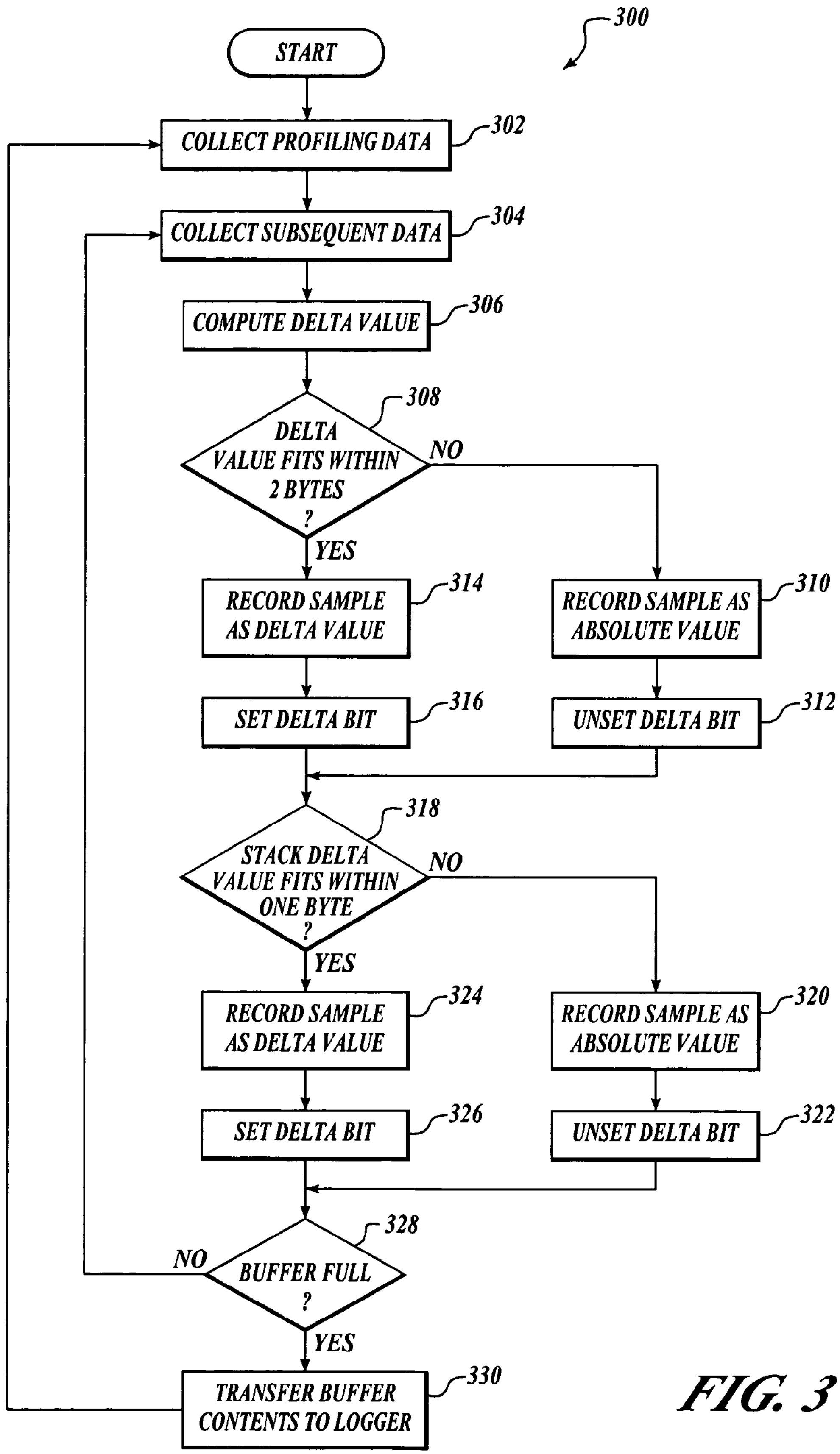
FIG. 3 is a flowchart that depicts an example method for performing data-aware data compression, according to another implementation of the present invention.

FIG. 3 depicts an example method 300 for performing data-aware data compression, according to another embodiment of the present invention. This scheme uses a combination of delta compression and common-value coding techniques to improve compression ratios while maintaining a local context. Further, multiple values can be compressed into a single record for further conservation of space. Moreover, the probe code remains as short and fast as possible, minimizing side effects on the performance of the profiled application due to effects such as memory cache modification.

In this embodiment of the present invention, uncompressed data records contain a four-byte header indicating the record type, flags, and length, an eight-byte counter value, a four-byte stack value, and a four-byte program address, for a total of twenty bytes. The compression scheme uses a delta bit in the type field to indicate whether the stack values and counter values are absolute values or successive delta (difference) values. The maximum delta value for a counter is two bytes, and the maximum delta value for the stack value is one byte. The record header is reduced from four bytes to one, while the program address is always recorded without modification. Thus, the number of bytes used for each record is reduced from twenty to eight. Moreover, the four-byte alignment constraint required for data buffers is thereby maintained.

The delta bit in the type field can be either set or unset. A set delta bit indicates that the stack delta value from the previous value fits within eight bits, and the counter delta value from the previous value fits within sixteen bits, and delta values are recorded in the probe data. On the other hand, an unset delta bit indicates that absolute values for both stack and counter values were recorded because one or both of the delta values did not fit. In this case, stack values occupy four bytes and counter values occupy eight bytes, as in the conventional format. This feature provides backwards compatibility so that the decompression scheme can read older profiling data files without difficulty.

First, at a block 302, data is collected as a function is entered or exited, or at another designated instrumentation point. The data is represented as records containing timestamp or other counter information and information regarding the stack context, i.e., the calling context and the location within the program at which the data was collected. According to this embodiment of the present invention, these records are compressed using an algorithm selected as a function of the type of data being compressed. That is, timestamp or other counter information is compressed in one way, while stack context information is compressed in a different way. Flags are compressed in still another way, by recording them implicitly as part of the one-byte record type.

In one conventional record format, for function entries and function exits, four bytes are reserved for recording absolute stack addresses and eight bytes are reserved for recording time stamps. Four bytes are reserved for a record header, and four bytes are reserved for a memory address within the profiled application. Accordingly, the minimum size needed for a data record is twenty bytes.

In the conventional format, the function entry and exit probes fill up a data buffer with successive entry and exit data records. In a particular embodiment of the present invention, the first sample collected in the buffer at block 302 always contains an absolute sample, while later samples may contain delta values. In this implementation, the probes do not incur additional computational overhead for calculating the delta values. Rather, they deliver absolute values into the buffers as in the conventional implementation. When a buffer becomes full, its contents are transferred to a logger for writing to the profiling data file.

After the first sample is collected in the buffer, a subsequent sample is collected at a block 304. A delta value is computed from the subsequent sample at a block 306. This delta value represents the difference either in counter value or in stack context from the previous sample.

At a decision block 308, the counter delta value is then analyzed to determine whether it will fit within two bytes, the maximum delta value for a particular counter. If not, the sample is recorded as an absolute value rather than a delta value at a block 310, and the delta bit is unset at a block 312 to indicate that the sample was recorded as an absolute value. As an alternative, further analysis can be performed to determine whether the delta value would fit in a larger block; if so, a different encoding scheme may be used to store the delta value. If the system determines that the delta value will fit within two bytes, the sample is recorded as an encoded delta value at a block 314, and the delta bit is set at a block 316.

Next, at a decision block 318, the stack delta value is then analyzed to determine whether it will fit within one byte, the maximum delta value for stack data. If not, the sample is recorded as an absolute value rather than a delta value at a block 320, and the delta bit is unset at a block 322 to indicate that the sample was recorded as an absolute value. As an alternative, further analysis can be performed to determine whether the delta value would fit in a larger block; if so, a different encoding scheme may be used to store the delta value. If the system determines that the delta value will fit within one byte, the sample is recorded as an encoded delta value at a block 324 and the delta bit is set at a block 326.

Next, at a decision block 328, it is determined whether the buffer is full. If not, execution then returns to block 304, at which another subsequent sample is collected. If the buffer is full, its contents are transferred to the logger at a block 330, after which execution returns to block 302, at which the first sample in the now empty buffer is collected.

The type of encoding scheme used depends on the type of delta value being encoded. For example, because the timestamp values monotonically increase, the delta values are stored as unsigned quantities. By contrast, stack addresses always change in one direction on entering a function, and change in the opposite direction on exiting the function. Therefore, stack delta values are stored as unsigned quantities representing a number with one sign on function entry records and a number with the opposite sign on function exit records.

To improve compression further, the delta value is encoded before it is stored. In a particular embodiment, the delta value is encoded with reference to a set of 256 typical delta values for the particular type of delta value. This aspect of the compression scheme is dependent on the type of delta value in that, for example, timestamp delta values are encoded with reference to a different set of typical delta values than is used in encoding stack address delta values. This common value encoding technique can be used to represent the vast majority of delta values. The remaining delta values, i.e., those other than the 256 typical delta values, are simply stored as 16-bit delta values. Any associated flags are also compressed using a common value encoding technique.

Other known properties of the behavior of timestamp and stack delta values are used in the encoding process. For example, when a function is entered, it is known that the stack value will change in some direction (either positive or negative) by a multiple of four. Similarly, when the function is exited, the stack value will change in the opposite direction by a multiple of four. Thus, savings can be realized by dividing the absolute value of the stack delta value by four before encoding it. It should be noted that, because the sign of the delta value (positive or negative) is implicit in whether the function is being entered or exited, the sign need not be encoded.

Further efficiencies can be realized in certain circumstances. For example, many function entry and function exit probes are used to instrument entry into and exit from the same function. Conventionally, timestamp and stack context information is recorded for both probes. According to a particular embodiment of the present invention, however, improved compression efficiency is realized by recording a single delta value for the stack context information, since the stack context information remains unchanged between entry into and exit from the function. Similarly, if the timestamp delta value on function entry and the timestamp delta value on function exit can each be encoded into a single byte, improved compression efficiency is realized by recording a single record containing one byte of header information, one byte of stack data, two bytes of timestamp data, and four bytes of program address to represent the function entry and exit records, replacing forty uncompressed bytes with only eight compressed bytes.

While the embodiments of the invention have been described with specific focus on their embodiment in a software implementation, the invention as described above is not limited to software embodiments. For example, the invention may be implemented in whole or in part in hardware, firmware, software, or any combination thereof. The software of the invention may be embodied in various forms, such as a computer program encoded in a machine-readable medium, such as a CD-ROM, magnetic medium, ROM or RAM, or in an electronic signal. Further, as used in the claims herein, the term "module" shall mean any hardware or software component, or any combination thereof.

What is claimed is:

1. A computer-implemented method for compressing profiling data, the method comprising:

collecting the profiling data to be compressed during execution of an application using at least one probe;

collecting a sample of the profiling data to be compressed;

comparing the profiling data to the sample of the profiling data to determine difference information;

determining whether the difference information is time stamp difference information or stack difference information;

responding to the difference information satisfying a size constraint by encoding the difference information with reference to a set of commonly occurring difference values for the type of profiling data to be compressed;

accumulating the difference information in a buffer; and compressing the difference information such that the probe is independent of the type of profiling data to be compressed.

2. The method of claim 1, further comprising, before comparing the profiling data to the sample of the profiling data, storing an initial counter value for the data to be compressed.

3. The method of claim 1, further comprising storing the contents of the buffer in a profiling data file in response to the buffer accumulating a predetermined amount of difference information.

4. The method of claim 1, further comprising, if the difference information is determined to be timestamp difference information, encoding the difference information as an unsigned quantity with reference to a set of commonly occurring timestamp difference values.

5. The method of claim 1, further comprising, if the difference information is determined to be stack difference information:

encoding the difference information as an unsigned quantity with reference to a set of commonly occurring stack difference values, and reconstructing a sign of a stack difference value from a context of one of: function entry and function exit.

6. The method of claim 1, further comprising, if the difference information is determined to be stack difference information, dividing a quantity represented by the difference information by four before encoding the difference information.

7. The method of claim 1, further comprising, if the type of data to be compressed is stack data collected upon entry to and exit from a function, recording a single difference value for the stack data.

8. A computer-implemented method for compressing profiling data, the method comprising:

collecting the profiling data during execution of an application using at least one probe;

collecting a sample of the profiling data to be compressed;

comparing the profiling data to the sample of the profiling data to determine difference information;

determining whether the difference information is time stamp difference information or stack difference information;

if the profiling data is determined to be timestamp data, encoding the difference information as an unsigned quantity with reference to a set of commonly occurring timestamp difference values;

if the profiling data is determined to be stack data:

encoding the difference information as an unsigned quantity with reference to a set of commonly occurring stack difference values, and reconstructing a sign of a stack difference value from a context of one of function entry and function exit;

accumulating the difference information in a buffer; and compressing the difference information such that the probe is independent of the type of profiling data.

9. A computer-readable medium having stored thereon computer-executable modules comprising:

at least one probe, configured to collect profiling data to be compressed during execution of an application, and collect a sample of the profiling data to be compressed; and a buffer, configured to:

compare the profiling data to the sample of the profiling data to determine difference information, determine whether the difference information is time stamp difference information or stack difference information, respond to the difference information satisfying a size constraint by encoding the difference information with reference to a set of commonly occurring difference values for a type of the profiling data, accumulate the difference information, and compress the difference information such that the probe is independent of the type of profiling data.

10. The computer-readable medium of claim 9, wherein the buffer is further configured to, before the profiling data is compared to the sample of the profiling data, store an initial counter value for the profiling data.

11. The computer-readable medium of claim 9, wherein the computer-executable modules further comprise a logger, configured to receive and store the contents of the buffer in a profiling data file in response to the buffer accumulating a predetermined amount of difference information.

12. The computer-readable medium of claim 11, wherein the buffer is further configured to transfer the compressed contents of the buffer to the logger.

13. The computer-readable medium of claim 9, wherein the buffer is further configured to, if the difference information is determined to be timestamp difference information, encode the difference information as an unsigned quantity with reference to a set of commonly occurring timestamp difference values.

14. The computer-readable medium of claim 9, wherein the buffer is further configured to, if the difference information is determined to be stack difference information:

encode the difference information as an unsigned quantity with reference to a set of commonly occurring stack difference values, and reconstruct a sign of a stack difference value from a context of one of: function entry and function exit.

15. The computer-readable medium of claim 9, wherein the buffer is further configured to, if the difference information is determined to be stack difference information, divide a quantity represented by the difference information by four before encoding the difference information.

16. The computer-readable medium of claim 9, wherein the buffer is further configured to, if the type of profiling data is determined to be stack data that is collected upon entry to and exit from a function, record a single difference value for the stack data.

17. A computer-readable medium having stored thereon computer-executable modules comprising:

at least one probe, configured to:

collect profiling data during execution of an application, and collect a sample of the profiling data to be compressed; and a buffer, configured to:

compare the profiling data to the sample of the profiling data to determine difference information, determine whether the difference information is time stamp difference information or stack difference information, if the type of profiling data is determined to be timestamp data, encode the difference information as an unsigned quantity with reference to a set of commonly occurring timestamp difference values, if the type of profiling data is determined to be stack data:

encode the difference information as an unsigned quantity with reference to a set of commonly occurring stack difference values, reconstruct a sign of a stack difference value from a context of one of:

function entry and function exit, accumulate the difference information, and compress the difference information such that the probe is independent of the type of profiling data.

18. A computer arrangement comprising:

at least one probe, configured to;

collect profiling data during execution of an application, and collect a sample of the profiling data to be compressed; and a buffer, configured to:

compare the profiling data to the sample of the profiling data to determine difference information, determine whether the difference information is time stamp difference information or stack difference information, respond to the difference information satisfying a size constraint by encoding the difference information with reference to a set of commonly occurring difference values for the type of profiling data, accumulate the difference information, and compress the difference information such that the probe is independent of the type of profiling data.

19. The computer arrangement of claim 18, wherein the buffer is further configured to, before the profiling data is compared to the sample of the profiling data, store an initial counter value for the profiling data.

20. The computer arrangement of claim 18, wherein the computer-executable modules further comprise a logger, configured to receive and store the contents of the buffer in a profiling data file in response to the buffer accumulating a predetermined amount of difference information.

21. The computer arrangement of claim 20, wherein the buffer is further configured to, in response to accumulating the predetermined amount of difference information, transfer the compressed contents to the logger.

22. The computer arrangement of claim 18, wherein the buffer is further configured to, if the difference information is determined to be timestamp difference information, encode the difference information as an unsigned quantity with reference to a set of commonly occurring timestamp difference values.

23. The computer arrangement of claim 18, wherein the buffer is further configured to:

if the difference information is determined to be stack difference information, encode the difference information as an unsigned quantity with reference to a set of commonly occurring stack difference values, and reconstruct a sign of a stack difference value from a context of one of: function entry and function exit.

24. The computer arrangement of claim 18, wherein the buffer is further configured to, if the difference information is determined to be stack difference information, divide a quantity represented by the difference information by four before encoding the difference information.

25. The computer arrangement of claim 18, wherein the buffer is further configured to, if the profiling data is stack data collected upon entry to and exit from a function, record a single difference value for the stack data.

26. A computer arrangement comprising:

at least one probe, configured to:

collect profiling data to be compressed during execution of an application, and collect a sample of the profiling data to be compressed; and a buffer, configured to:

compare the profiling data to the sample of the profiling data to determine difference information, determine whether the profiling data is time stamp data or stack data, if the type of profiling data is determined to be timestamp data, encode the difference information as an unsigned quantity with reference to a set of commonly occurring timestamp difference values, and if the type of profiling data is determined to be stack data:

encode the difference information as an unsigned quantity with reference to a set of commonly occurring stack difference values, and reconstruct a sign of a stack difference value from a context of one of:

function entry and function exit, accumulate the difference information, and compress the difference information such that the probe is independent of the type of profiling data.

* * * * *

UNITED STATES PATENT AND TRADEMARK OFFICE

CERTIFICATE OF CORRECTION

PATENT NO. : 6,961,927 B1
APPLICATION NO. : 09/722774
DATED : November 1, 2005
INVENTOR(S) : Erb et al.

It is certified that error appears in the above-identified patent and that said Letters Patent is hereby corrected as shown below:

In column 10, line 58, in Claim 8, after "one of" insert -- : --.

In column 10, line 65, in Claim 9, after "to" insert -- : --.

Signed and Sealed this

Twenty-third Day of March, 2010

David J. Kappos
*Director of the United States Patent and Trademark Office*